UNITED STATES PATENT OFFICE.

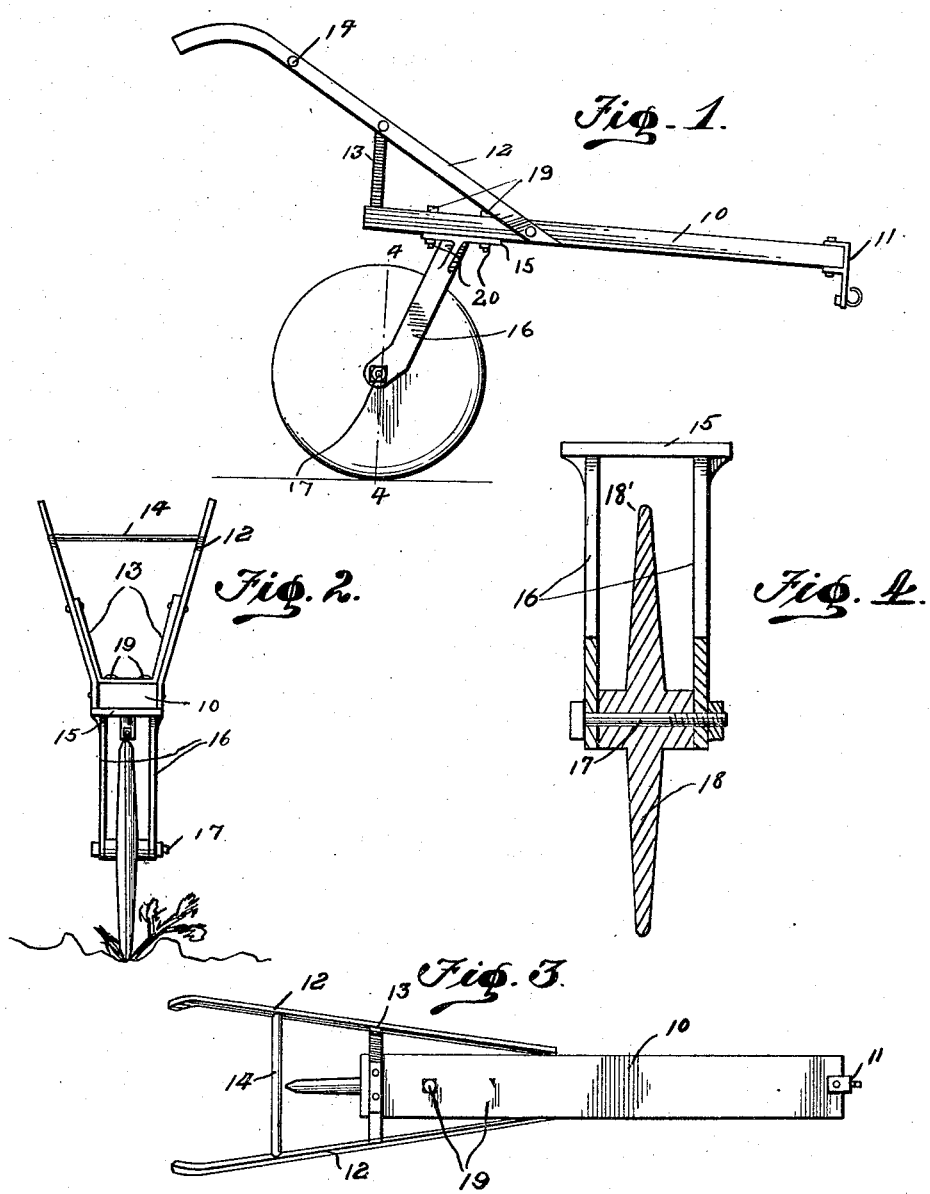

MANUAL LISBERG, OF SLIDELL, LOUISIANA.

PLANTING-MACHINE.

1,277,228. Specification of Letters Patent. Patented Aug. 27, 1918.

Application filed October 9, 1917. Serial No. 195,597.

*To all whom it may concern:*

Be it known that I, MANUAL LISBERG, a citizen of the United States, residing at Slidell, in the parish of St. Tammany, State of Louisiana, have invented certain new and useful Improvements in Planting-Machines; and I do hereby declare the following to be a full, clear, and exact description of the invention, such as will enable others skilled in the art to which it appertains to make and use the same.

This invention relates to improvements in planting machines and particularly to devices for planting plants.

One object of the present invention is to provide a novel and efficient device whereby a large number of plants can be quickly and easily planted in the ground.

Another object is to provide a device of this character whereby the plants can be efficiently and properly placed in the ground in even and straight rows.

Other objects and advantages will be apparent from the following description when taken in connection with the accompanying drawing.

In the drawing:

Figure 1 is a side elevation of my improved planting machine.

Fig. 2 is a rear elevation of the same showing the action of the same on the plants which are laid across the trench in the ground.

Fig. 3 is a top plan view of the device.

Fig. 4 is a vertical sectional view taken on the line 4—4 of Fig. 1.

Referring particularly to the accompanying drawing 10 represents a beam which carries on one end the draft means 11. Secured to the beam, intermediate the length thereof, are the forward ends of the upwardly and rearwardly extending handles 12. Secured to the rear end of the beam are the upwardly and laterally directed supporting arms 13, the upper end of which are connected to the said handles. A transverse connecting rod 14 extends between the rear portions of the handles, said rod being adapted for spacing the handles the proper distance apart.

Disposed against the lower face of the rear portion of the beam is a metal block 15, from the lower face of which there extend the depending parallel spaced legs 16. Between the legs, and carried by the lower ends thereof, is a transverse shaft or axle 17, and mounted on the shaft intermediate the legs is a roller 18. This roller is preferably in the form of a double-convex disk, with the periphery slightly rounded, as shown at 18'. Extending vertically through the beam and through the said block are the securing bolts 19, the same being held in proper position by the nuts 20 on the lower ends thereof.

In the use of the device, a number of plants are placed transversely of the furrow or trench which has been previously prepared in the ground, with their intermediate portions across the furrow. The machine is then driven down the furrow so that the periphery of the roller travels in the furrow. As the roller passes over the plants their intermediate portions are forced down into the ground, after which any suitable device may be used to lift the soil at the sides of the plants to form ridges or hills.

Thus the labor and time usually expended in planting the plants or vines is reduced to a minimum, and permitting one man to plant five acres in one day, whereas it formerly required two men to plant one-half an acre in a day.

What is claimed is:

A vine planting machine comprising a draft beam having spaced rearwardly inclined depending legs, a flat base uniting the same and secured transversely to the under side of the beam near its rear end, an axle mounted transversely in the spaced legs, a roller journaled on the axle and being in the form of a double convexed disk with the periphery slightly rounded, and guide handles arranged in forward convergent relation to each other fixed to the beam in advance of the legs.

In testimony whereof, I affix my signature in the presence of two witnesses.

MANUAL LISBERG.

Witnesses:
CYREL PERRY,
FRANK FACIANE.

Copies of this patent may be obtained for five cents each, by addressing the "Commissioner of Patents, Washington, D. C."